United States Patent Office
3,198,803
Patented Aug. 3, 1965

3,198,803
O-ETHERS OF PYRIDINEALDOXIME-1-OXIDES
Wilhelm Mathes, Ludwigshafen, Rhine, Germany, and John P. Da Vanzo, Portage Township, Kalamazoo County, Mich., assignors to Dr. F. Raschig, G.m.b.H., Ludwigshafen (Rhine), Germany, a company
No Drawing. Filed June 30, 1961, Ser. No. 120,940
25 Claims. (Cl. 260—296)

This invention pertains to novel chemical compounds, novel pharmaceutical compositions containing the same, and a novel process. More particularly, the invention is directed to O-ethers of pyridinealdoxime-1-oxides, oral and parenteral pharmaceutical compositions containing the same, and to a process for controlling neuromuscular and neurotic reactions in mammals.

The novel O-ethers of pyridinealdoxime-1-oxides of the invention comprise compounds represented by the following structural formula:

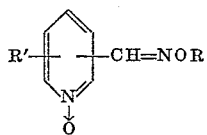

(I)

wherein R is a hydrocarbon radical of from one to twelve carbon atoms, inclusive, and R' is selected from the class consisting of hydrogen atoms and methyl groups, and the acid addition salts thereof. The term "hydrocarbon radical of from one to twelve carbon atoms, inclusive," is intended to include (a) saturated and unsaturated acyclic aliphatic hydrocarbon radicals such as alkyl radicals of which examples are methyl, ethyl, propyl, butyl, amyl, hexyl, heptyl, octyl, nonyl, decyl, undecyl, and dodecyl, and alkenyl radicals of which examples are allyl, butenyl, pentenyl, hexenyl, heptenyl, and octenyl, (b) saturated and unsaturated cycloaliphatic hydrocarbon radicals of which examples are cyclopropyl, cyclobutyl, cyclopentyl, 2-cyclopentenyl, 1-cyclopentenyl, cyclohexyl, 2-cyclohexenyl, cycloheptyl, and cyclooctyl, (c) saturated and unsaturated cycloaliphaticalkyl hydrocarbon radicals of which examples are cyclopentylmethyl, 2-cyclopentenylmethyl, cyclohexylmethyl, 2-cyclohexenylmethyl, and cyclohexylethyl, and (d) saturated and unsaturated araliphatic hydrocarbon radicals of which examples are benzyl, 2-phenethyl, cinnamyl, 1-naphthylmethyl, and 2-naphthylmethyl; and the like. The acid addition salts include the salts of compounds of the above structural formula with acids such as hydrochloric acid, hydrobromic acid, nitric acid, phosphoric acid, sulfuric acid, methanesulfonic acid, p-toluenesulfonic acid, and the like.

An object of this invention is to provide new and useful chemical compounds. Another object of the invention is to provide compounds represented by Formula I, above. Still another object of the invention is to provide O-ethers of pyridinealdoxime-1-oxides, including their acid addition salts, which are safe and effective pharmacologics and which are superior to the corresponding 1-unoxidized compounds, i.e., tertiary amines. A further object of the invention is to provide pharmaceutical compositions containing as the essential active ingredient compounds of Formula I, above, including their acid addition salts. A still further object of the invention is to provide a process for controlling neuromuscular, neurotic, psychotic, and psychoneurotic conditions in mammals. Other objects of the invention will be apparent to those skilled in the art.

These and other objects of the invention are accomplished since it has now been found that the compounds of this invention possess unexpected and valuable pharmacologic activities. The compounds are active and useful as anti-inflammatory agents, analgetics, anticonvulsants, muscle relaxants, tranquilizers, antipyretic agents, and drug potentiators (e.g., potentiation of barbiturate-induced sleep in mammals).

The novel compounds of the invention having Formula I, above, are prepared by reacting an O-ether of pyridinealdoxime represented by the structural formula:

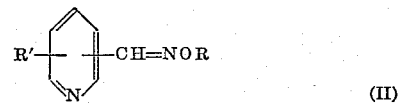

(II)

wherein R and R' are as defined above, with a peroxidizing agent, for example, hydrogen peroxide (preferred), benzoyl peroxide, and the like. The reaction, advantageously, is carried out in an inert solvent, illustratively, acetic acid, propionic acid, butyric acid, and the like, at temperatures ranging between about 50° C. and about 90° C. The O-ethers of pyridinealdoxime-1-oxides thus obtained are separated from the reaction mixture and recovered in pure form by conventional procedures such as solvent evaporation, solvent extraction, vacuum distillation, and recrystallization. Generally speaking, these 1-oxides are crystalline solids. They readily form salts with acids and the salts can be prepared in a convenient manner by neutralization of the 1-oxide with an equivalent of the desired acid, or if desired, by metathesis.

The compounds of this invention can also be prepared by reacting a pyridinecarboxaldehyde-1-oxide with an O-substituted hydroxylamine to give the corresponding O-ether of pyridinealdoxime-1-oxide.

The O-ethers of pyridinealdoxime (compounds of Formula II, above) which are used as the starting compounds for preparing the 1-oxides of this invention can be prepared in accordance with procedures described in U.S. Patent 2,924,604. Moreover, O-ethers of pyridinealdoxime can also be prepared by reacting a pyridinecarboxaldehyde with an O-substituted hydroxylamine. The oxidation of the 1-nitrogen is then carried out according to conventional procedures outlined above.

When used in therapy, the novel O-ethers of pyridinealdoxime-1-oxide in the form of the free base or in the form of acid addition salts with pharmacologically acceptable acids, can be formulated in novel unit dosage compositons for administration via oral or parenteral routes.

As employed herein, "unit dosage" is intended to mean that quantity or amount of a composition which is physically separable and contains a readily determinable quantity of active ingredient. The proportion of active ingredient in a unit dosage is determined by (a) the individual characteristics of the active ingredient and the carrier and (b) the therapeutic effect desired. Representative unit dosages are, e.g., a tablet, a capsule, a pill, a powder packet, a wafer, a cachet, a teaspoonful, a tablespoonful, a drop, a cubic centimeter, and segregated multiples thereof.

Unit dosage compositions for oral administration can be formulated with a pharaceutical carried in solid or liquid forms. Suitable solid forms include tablets, pills, capsules, granules, powders, wafers, and cachets. Advantageously, the pharmaceutical carrier for such solid forms includes, e.g., cornstarch, lactose, dicalcium phosphate, terra alba (calcium sulfate), talc, stearic acid, magnesium stearate, gums, and functionally similar materials. The tablets or pills can be laminated or otherwise compounded to provide unit dosages affording the advantage of prolonged or delayed action or of predetermined sequential release of the medication. For example, the tablet or pill can be compounded with concentric laminae. The laminae are separated by enteric coating, for example, one which resists disintegration in the stomach, or otherwise permits the inner laminae to pass intact through the stomach into the duodenum for release there or further in the intestines. A variety of substances can be used for such enteric layers or coatings; representative ones include a number of polymeric acids or mixtures of polymeric acids with such materials as shellac, shellac and cetyl alcohol, cellulose acetate phthalate, and the like. A particularly advantageous enteric coating comprises a styrene-maleic acid copolymer, Suitable liquid forms include solutions, suspensions, and emulsions. Advantageously, the pharmaceutical carrier for such liquid forms comprises water, oils, and oil-water emulsions, and the like. If desired, suitable dispersing or suspending agents can be included, for example, tragacanth, acacia, alginates, dextran, sodium carboxymethylcellulose, methylcellulose, polyvinylpyrrolidone, gelatin, and mixtures thereof. Oils suitable for solutions and oil-water emulsions include cottonseed oil, sesame oil, coconut oil, and peanut oil. Liquid compositions can contain from about 1% to about 50%, weight by volume, of the active ingredient.

For parenteral administration the O-ethers of pyridinealdoxime-1-oxides can be formulated in dilute sterile aqueous solutions, aqueous suspensions, and oil solutions or suspensions, for intramuscular or intraperitoneal injections, or like routes.

The dosage of O-ether of pyridinealdoxime-1-oxide depends upon the route of administration, and the circumstances of treatment (e.g., severity of the condition to be treated and the duration of treatment), as well as the patient's age, weight, and general physical condition. In general, a total daily dosage of from about 1 to about 50 mg./kg. of body weight is effective. Single daily, divided daily, or intermittent schedules can be employed.

For example, the novel compounds of this invention can be administered to adults in single doses of from about 25 to about 500 mg. given 1 to 4 times daily to a total daily dose of from about 25 to about 2000 mg. Single oral doses of 5 ml. (1 teaspoonful) containing from about 1% to about 20% active ingredient are preferred for liquid preparations.

Where a combination of pharmacologic effects is desired compositions containing, in addition to the aforesaid principal active ingredients, one or more of the following secondary active ingredients can be employed advantageously: additional tranquilizers such as reserpine, chlorpromazine, meprobamate, and ectylurea; psychic energizers such as methylphenidate hydrochloride and α-ethyltryptamine acetate; sedatives such as glutethimide, petrichloral, chloral hydrate, and methyprylon; hypotensive agents such as phenoxybenzamine hydrochloride; analgesics such as aspirin, phenacetin, salicylamide, N-acetyl-p-aminophenol, and codeine; anti-spasmodics such as methscopolamine bromide and propantheline bromide; anticonvulsants such as diphenylhydantoin, paramethadione phenylacethylurea, and phensuxamide; anti-arthritic agents such as prednisolone, methylprednisolone, and 6α-fluoroprednisolone; muscle relaxants such as chlorzoxazone, carisoprodol, and phenaglycodol. The amounts of the foregoing secondary active ingredients to be incorporated in the present compositions should not exceed the amounts comprising individual doses of the said secondary active ingredients where they are employed singly.

The O-ethers of 4-pyridinealdoxime-1-oxides of this invention are of particular interest, because, unlike the corresponding tertiary amines, they portect mammals, e.g., mice, rats, cats, guinea pigs, and rabbits from convulsions and death due to thiosemicarbazide (TSC) toxicity. In this respect, the new compounds are substantially equivalent in action to other known compounds in protecting mammals from toxicity and the pyridoxal (vitamin $B_6$) depletion caused by TSC. Furthermore, these compounds of the invention are useful for investigating the biochemical mechanism of thiosemicarbazide toxicity and the biochemical functions of vitamin $B_6$.

The following preparations and examples are illustrative of the products of the present invention, but are not to be construed as limiting.

EXAMPLE 1

*Preparation of O-n-propyl ether of 4-pyridinealdoxime-1-oxide*

A reaction mixture consisting of 82 g. (0.5 mole) of O-n-propyl ether of 4-pyridinealdoxime, 300 ml. of glacial acetic acid, and 100 ml. of 30% aqueous hydrogen peroxide was heated at 70° to 75° C. for 6 hrs. After distilling the solvent under reduced pressure, the residue was made just alkaline with saturated aqueous sodium carbonate solution and 400 ml. of water was added. The aqueous alkaline solution was extracted 3 times with 150-ml. portions of chloroform, and the combined chloroform extracts were dried over anhydrous sodium sulfate. The chloroform was then evaporated at 20° to 30° C. under reduced pressure, and any residual traces of chloroform were removed in a vacuum desiccator. The 82 g. of yellowish-brown crystals thus obtained were recrystallized from 160 ml. of a 1:2 mixture (by volume) of chloroform and ligroin (aliphatic hydrocarbon fraction boiling at 30° to 75° C.). The crystals were recovered on a filter, and they were washed until colorless with the same solvent mixture. There was thus obtained 37 g. of O-n-propyl ether of 4-pyridinealdoxime-1-oxide having a melting point of 78° to 79° C.

*Analysis.*—Calc'd for $C_9H_{12}N_2O_2$: C, 59.98; H, 6.71; N, 15.55. Found: C, 60.14; H, 6.59; N, 15.28.

EXAMPLE 2

*Preparation of O-benzyl ether of 6-methyl-2-pyridinealdoxime-1-oxide*

A reaction mixture consisting of 113 g. (0.5 mole) of O-benzyl ether of 6-methyl-2-pyridinealdoxime, 300 ml. of glacial acetic acid, and 100 ml. of 30% aqueous hydrogen peroxide was heated on a steam bath for 4 hrs. The solvent was then removed completely at 40° to 50° C. under reduced pressure, and the residue was made alkaline with 100 ml. of saturated aqueous sodium carbonate solution. The alkaline solution was extracted exhaustively with chloroform, and the chloroform extracts were combined and evaporated to give 117 g. of a yellowish oil which very slowly crystallized. After dissolving the crystals in hot isopropyl ether, the solution was filtered over charcoal, and cooled with agitation in ice-water. The yellowish crystals that formed were recovered on a filter and dried, yielding 73 g. of O-benzyl ether of 6-methyl-2-pyridinealdoxime-1-oxide having a melting point of 61° to 62° C.

PREPARATION I

O-ALLYL ETHER OF 4-PYRIDINEALDOXIME

A solution consisting of 122 g. (1 mole) of 4-pyridinealdoxime and 54 g. (1 mole) of sodium methoxide in 1 l. of absolute methanol was stirred at about 25° C. while 121 g. (1 mole) of allyl bromide was added over an interval of 10 minutes. The reaction mixture was heated at reflux temperature for 1 hr. and then cooled. The cooled mixture was poured into 3 l. of ice-water and extracted with four 1 l. portions of ether. The ether extracts were combined and washed with four 500-ml. portions of water. The extracts were then dried over anhydrous magnesium sulfate, and the ether was removed by distillation. There was thus obtained 85.5 g. of O-allyl ether of 4-pyridinealdoxime having a B.P. of 62° to 63° C. at 0.03 mm. of mercury pressure, and a refractive index ($n_D^{24°}$) of 1.5458.

EXAMPLE 3

*Preparation of O-allyl ether of 4-pyridinealdoxime-1-oxide and hydrochloride thereof*

A solution of 45.7 g. (0.282 mole) of O-allyl ether of 4-pyridinealdoxime (Preparation I, above) in 290 ml. of glacial acetic acid and 46 ml. of 30% aqueous hydrogen peroxide was stirred at 70° C. for about 16 hrs. The solvent was then evaporated at about 55° C. under reduced pressure, and the residue was mixed with 100 ml. of water. The water was evaporated at about 55° C. under reduced pressure, the oily residue was mixed with 1 l. of anhydrous ether, and the mixture was stirred for 1 hr. The ether layer was decanted and treated with ethereal hydrogen chloride, and the thus-precipitated O-allyl ether of 4-pyridinealdoxime-1-oxide hydrochloride was recovered on a filter. After recrystallization from methyl ethyl ketone there was obtained 24 g. of slightly tan crystals of O-allyl ether of 4-pyridinealdoxime-1-oxide hydrochloride having a melting point of 120° to 122° C.

*Analysis.*—Calc'd for $C_9H_{10}N_2O_2 \cdot HCl$: C, 50.36; H, 5.17; N, 13.05; Cl, 16.52. Found: C, 50.37; H, 5.05; N, 12.74; Cl, 16.12.

A solution of 10 g. of O-allyl ether of 4-pyridinealdoxime-1-oxide hydrochloride in 25 ml. of water was basified with an excess of 20% aqueous sodium hydroxide solution. The mixture was extracted with five 100-ml. portions of ether. The ether extracts were combined and dried over anhydrous magnesium sulfate. The mixture was filtered and the ether was evaporated. The residual O-allyl ether of 4-pyridinealdoxime-1-oxide was recrystallized by dissolving it in a small amount of ethyl acetate, adding technical hexane (essentially a mixture of methyl-substituted pentanes and n-hexane having a boiling range of 140° to 160° F.) until the mixture became cloudy, and cooling the mixture to 0° C. The purified O-allyl ether of 4-pyridinealdoxime-1-oxide thus obtained had a melting point of 62° to 64° C.

*Analysis.*—Calc'd for $C_9H_{10}N_2O_2$: C, 60.66; H, 5.66; N, 15.72. Found: C, 60.79; H, 5.32; N, 15.74.

EXAMPLE 4

*Preparation of O-benzyl ether of 4-pyridinealdoxime-1-oxide*

A solution of 15 g. (0.07 mole) of O-benzyl ether of 4-pyridinealdoxime, 65 ml. of glacial acetic acid, and 11.4 ml. of 30% aqueous hydrogen peroxide was stirred at 70° C. for about 16 hrs. The solvent was then evaporated on a steam bath under reduced pressure, and the residue was mixed with 25 ml. of water. The water was evaporated on the steam bath under reduced pressure. The solid residue thus obtained was crystallized twice from ethyl acetate and once from methanol to give 7.7 g. of O-benzyl ether of 4-pyridinealdoxime-1-oxide as yellow needles having a melting point of 161° to 163° C.

*Analysis.*—Calc'd for $C_{13}H_{12}N_2O_2$: C, 68.41; H, 5.30; N, 12.28. Found: C, 68.23; H, 5.53; N, 11.95.

PREPARATION II

O-N-PROPYL ETHER OF 3-METHYL-4-PYRIDINEALDOXIME

A solution of 2.5 g. (0.03 mole) of anhydrous sodium acetate in 10 ml. of water was added to 3.45 g. (0.03 mole) of 3-methyl-isonicotinaldehyde and 3.4 g. (0.03 mole) of O-n-propylhydroxylamine hydrochloride in 25 ml. of ethanol. After refluxing the reaction mixture with stirring for 3.5 hours, 150 ml. of water was added and the cloudy solution thus produced was extracted with three 100-ml. portions of methylene chloride. The extracts were combined, washed with 100 ml. of water, dried over anhydrous magnesium sulfate, filtered, and evaporated to give O-n-propyl ether of 3-methyl-4-pyridinealdoxime.

EXAMPLE 5

*Preparation of O-n-propyl ether of 3-methyl-4-pyridinealdoxime-1-oxide*

A solution of the O-n-propyl ether of 3-methyl-4-pyridinealdoxime (obtained above) and 5 ml. of 30% aqueous hydrogen peroxide in 25 ml. of glacial acetic acid was heated at 70° C. for 16 hours. The solvent was then evaporated, and the residue was mixed with 15 ml. of water. The water was evaporated, and the residue was mixed with 15 ml. of ethanol. After evaporating the ethanol, the crude O-n-propyl ether of 3-methyl-4-pyridinealdoxime-1-oxide was recrystallized by dissolving it in ether and adding technical hexane to the cloud point, and cooling the mixture to 0° C. The pale yellow crystals so obtained weighed 4.9 g. and had a melting point of 70° to 75° C. After four recrystallizations from the ether: technical hexane mixture the white O-n-propyl ether of 3-methyl-4-pyridinealdoxime-1-oxide had a melting point of 80° to 81° C.

*Analysis.*—Calc'd for $C_{10}H_{14}N_2O_2$: C, 61.83; H, 7.27; N, 14.42. Found: C, 61.60; H, 7.13; N, 14.60.

EXAMPLE 6

*Preparation of O-n-amyl ether of 4-pyridinealdoxime-1-oxide and hydrochloride thereof*

Following the procedure of Example 3 but substituting O-n-amyl ether of 4-pyridinealdoxime for the O-allyl ether of 4-pyridinealdoxime, there were prepared the corresponding O-n-amyl ether of 4-pyridinealdoxime-1-oxide (having a M.P. of 81° to 83° C.) and hydrochloride thereof.

*Analysis.*—Calc'd for $C_{11}H_{16}N_2O_2$: C, 63.44; H, 7.75; N, 13.45. Found: C, 63.67; H, 7.61; N, 13.60.

EXAMPLE 7

*Preparation of O-n-hexyl ether of 4-pyridinealdoxime-1-oxide and hydrochloride thereof*

Following the procedure of Example 3 but substituting O-n-hexyl ether of 4-pyridinealdoxime for the O-allyl ether of 4-pyridinealdoxime, there were prepared the corresponding O-n-hexyl ether of 4-pyridinealdoxime-1-oxide (having a M.P. of 66° to 68° C.) and hydrochloride thereof.

*Analysis.*—Calc'd for $C_{12}H_{18}N_2O_2$: C, 64.84; H, 8.16; N, 12.61. Found: C, 65.08; H, 8.18; N, 12.57.

EXAMPLE 8

*Preparation of O-allyl ether of 2-methyl-4-pyridinealdoxime-1-oxide*

Following the procedure of Example 5, but substituting O-allyl ether of 2-methyl-4-pyridinealdoxime for O-n-propyl ether of 3-methyl-4-pyridinealdoxime, there was prpared the coresponding O-allyl ether of 2-methyl-4-pyridinealdoxime-1-oxide.

EXAMPLE 9

*Preparation of O-n-propyl ether of 3-pyridinealdoxime-1-oxide*

Following the procedure of Example 4 but substituting O-n-propyl ether of 3-pyridinealdoxime for O-benzyl ether of 4-pyridinealdoxime, there was prepared the corresponding O-n-propyl ether of 3-pyridinealdoxime-1-oxide having a melting point of 65° to 66.5° C.

*Analysis.*—Calc'd for $C_9H_{12}N_2O_2$: C, 59.98; H, 6.71; N, 15.55. Found: C, 59.79; H, 6.54; N, 15.37.

EXAMPLE 10

*Preparation of O-isopropyl ether of 3-pyridinealdoxime-1-oxide*

Following the procedure of Example 1 but substituting O-isopropyl ether of 3-pyridinealdoxime for O-n-propyl ether of 4-pyridinealdoxime, there was prepared the corresponding O-isopropyl ether of 3-pyridinealdoxime-1-oxide having a melting point of 108° to 109° C.

EXAMPLE 11

*Preparation of O-n-propyl ether of 2-pyridinealdoxime-1-oxide*

Following the procedure of Example 1 but substituting O-n-propyl ether of 2-pyridinealdoxime for O-n-propyl ether of 4-pyridinealdoxime, there was prepared the corresponding O-n-propyl ether of 2-pyridinealdoxime-1-oxide in the form of an oily liquid.

EXAMPLE 12

*Preparation of O-isoamyl ether of 3-pyridinealdoxime-1-oxide*

Following the procedure of Example 1 but substituting O-isoamyl ether of 3-pyridinealdoxime for O-n-propyl ether of 4-pyridinealdoxime, there was prepared the corresponding O-isoamyl ether of 3-pyridinealdoxime-1-oxide having a melting point of 93° to 94° C.

EXAMPLE 13

*Preparation of O-methyl ether of 4-pyridinealdoxime-1-oxide*

Following the procedure of Example 1 but substituting O-methyl ether of 4-pyridinealdoxime for O-n-propyl ether of 4-pyridinealdoxime, there was prepared the corresponding O-methyl ether of 4-pyridinealdoxime-1-oxide having a melting point of 118° to 119° C.

EXAMPLE 14

*Preparation of O-isopropyl ether of 4-pyridinealdoxime-1-oxide*

Following the procedure of Example 1 but substituting O-isopropyl ether of 4-pyridinealdoxime for O-n-propyl ether of 4-pyridinealdoxime, there was prepared the corresponding O-isopropyl ether of 4-pyridinealdoxime-1-oxide having a melting point of 93° to 94° C.

EXAMPLE 15

*Preparation of O-n-butyl ether of 4-pyridinealdoxime-1-oxide*

Following the procedure of Example 1 but substituting O-n-butyl ether of 4-pyridinealdoxime for O-n-propyl ether of 4-pyridinealdoxime, there was prepared the corresponding O-n-butyl ether of 4-pyridinealdoxime-1-oxide having a melting point of 78° to 79° C.

EXAMPLE 16

*Preparation of O-n-dodecyl ether of 4-pyridinealdoxime-1-oxide*

Following the procedure of Example 1 but substituting O-n-dodecyl ether of 4-pyridinealdoxime for O-n-propyl ether of 4-pyridinealdoxime, there was prepared the corresponding O-n-dodecyl ether of 4-pyridinealdoxime-1-oxide having a melting point of 77.5° to 78° C.

EXAMPLE 17

*Preparation of O-cyclohexyl ether of 4-pyridinealdoxime-1-oxide*

Following the procedure of Example 4 but substituting O-cyclohexyl ether of 4-pyridinealdoxime for O-benzyl ether of 4-pyridinealdoxime, there was prepared the corresponding O-cyclohexyl ether of 4-pyridinealdoxime-1-oxide having a melting point of 129° to 131° C.

*Analysis.*—Calc'd for $C_{12}H_{16}N_2O_2$: C, 65.43; H, 7.32; N, 12.72. Found: C, 65.72; H, 7.13; N, 12.60.

EXAMPLE 18

*Preparation of O-(2-phenethyl) ether of 4-pyridinealdoxime-1-oxide*

Following the procedure of Example 4 but substituting O-(2-phenethyl) ether of 4-pyridinealdoxime for O-benzyl ether of 4-pyridinealdoxime, there was prepared the corresponding O-(2-phenethyl) ether of 4-pyridinealdoxime-1-oxide having a melting point of 119° to 121° C.

*Analysis.*—Calc'd for $C_{14}H_{14}N_2O_2$: C, 69.40; H, 5.82; N, 11.57. Found: C, 69.03; H, 6.03; N, 11.51.

EXAMPLE 19

*Preparation of O-(3-phenylpropyl) ether of 4-pyridinealdoxime-1-oxide hydrochloride*

Following the procedure of Example 3 but substituting O-(3-phenylpropyl) ether of 4-pyridinealdoxime for O-allyl ether of 4-pyridinealdoxime, there was prepared the corresponding O-(3-phenylpropyl) ether of 4-pyridinealdoxime-1-oxide hydrochloride having a melting point of 145° to 147° C.

*Analysis.*—Calc'd for $C_{15}H_{16}N_2O_2 \cdot HCl$: C, 61.53; H, 5.85; N, 9.57; Cl, 12.11. Found: C, 61.68; H. 5.51; N, 9.24; Cl, 12.38.

EXAMPLE 20

*Preparation of O-cinnamyl ether of 4-pyridinealdoxime-1-oxide and hydrochloride thereof*

Following the procedure of Example 3 but substituting O-cinnamyl ether of 4-pyridinealdoxime for O-allyl ether of 4-pyridinealdoxime, there were prepared the corresponding O-cinnamyl ether of 4-pyridinealdoxime-1-oxide (having a melting point of 125° to 127° C.) and hydrochloride thereof.

*Analysis.*—Calc'd for $C_{15}H_{14}N_2O_2$: C, 70.85; H, 5.55; N, 11.02. Found: C, 70.24; H, 5.60; N, 11.28.

EXAMPLE 21

*Preparation of O-crotyl ether of 4-pyridinealdoxime-1-oxide hydrochloride*

Following the procedure of Example 3 but substituting O-crotyl ether of 4-pyridinealdoxime for O-allyl ether of 4-pyridinealdoxime, there was prepared the corresponding O-crotyl ether of 4-pyridinealdoxime-1-oxide hydrochloride which decomposed beginning at 112° C.

*Analysis.* — Cal'd for $C_{10}H_{12}N_2O_2 \cdot HCl$: N, 12.25. Found: N, 12.35.

EXAMPLE 22

*Preparation of O-(1-methylallyl) ether of 4-pyridinealdoxime-1-oxide hydrochloride*

Following the procedure of Example 3 but substituting O-(1-methylallyl) ether of 4-pyridinealdoxime for O-allyl ether of 4-pyridinealdoxime, there was prepared the corresponding O-(1-methylallyl) ether of 4-pyridinealdoxime-1-oxide hydrochloride having a melting point of 104° to 106° C.

*Analysis.*—Calc'd for $C_{10}H_{12}N_2O_2 \cdot HCl$: C, 52.52; H, 5.73; N, 12.25. Found: C, 52.39; H, 5.68; N, 12.25.

EXAMPLE 23

*Preparation of O-ethyl ether of 4-pyridinealdoxime-1-oxide and hydrochloride thereof*

Following the procedure of Example 3 but substituting O-ethyl ether of 4-pyridinealdoxime for O-allyl ether of 4-pyridinealdoxime, there was prepared the corresponding O-ethyl ether of 4-pyridinealdoxime-1-oxide hydrochloride. The hydrochloride was converted by the procedure of Example 3 to the free base, O-ethyl ether of 4-pyridinealdoxime-1-oxide, having a melting point of 80° to 81° C.

*Analysis.*—Calc'd for $C_8H_{10}N_2O_2$: C, 57.82; H, 6.07; N, 16.86. Found: C, 58.11; H, 5.94; N, 16.92.

EXAMPLE 24

*Preparation of O-sec.butyl ether of 4-pyridinealdoxime-1-oxide and hydrochloride thereof*

Following the procedure of Example 3 but substituting O-sec.butyl ether of 4-pyridinealdoxime for O-allyl ether of 4-pyridinealdoxime, there were prepared the corresponding O-sec.butyl ether of 4-pyridinealdoxime-1-oxide (having a melting point of 61° to 62° C.) and hydrochloride thereof.

*Analysis.*—Calc'd for $C_{10}H_{14}N_2O_2$: C, 61.83; H, 7.26; N, 14.43. Found: C, 62.02; H, 7.35; N, 14.18.

Example 25

*Preparation of O-isobutyl ether of 4-pyridinealdoxime-1-oxide and hydrochloride thereof*

Following the procedure of Example 3 but substituting O-isobutyl ether of 4-pyridinealdoxime for O-allyl ether of 4-pyridinealdoxime, there were prepared the corresponding O-isobutyl ether of 4-pyridinealdoxime-1-oxide (having a melting point of 128° to 130° C.) and hydrochloride thereof.

*Analysis.*—Calc'd for $C_{10}H_{14}N_2O_2$: C, 61.83; H, 7.26; N, 14.43. Found: C, 62.08; H, 7.17; N, 14.15.

Example 26

*Preparation of O-(2-cyclopentenylmethyl) ether of 4-pyridinealdoxime-1-oxide*

Following the procedure of Example 4, but substituting O-(2-cyclopentenylmethyl) ether of 4-pyridinealdoxime for O-benzyl ether of 4-pyridinealdoxime, there was prepared the corresponding O-(2-cyclopentenylmethyl) ether of 4-pyridinealdoxime-1-oxide.

Example 27

*Preparation of O-(2-cyclohexenyl) ether of 2-methyl-3-pyridinealdoxime-1-oxide*

Following the procedure of Example 4, but substituting O-(2-cyclohexenyl) ether of 2-methyl-3-pyridinealdoxime for O-benzyl ether of 4-pyridinealdoxime, there was prepared the corresponding O-(2-cyclohexenyl) ether of 2-methyl-3-pyridinealdoxime-1-oxide.

Example 28

*Preparation of O-cyclohexylmethyl ether of 4-pyridinealdoxime-1-oxide*

Following the procedure of Example 4, but substituting O-cyclohexylmethyl ether of 4-pyridinealdoxime for O-benzyl ether of 4-pyridinealdoxime, there was prepared the corresponding O-cyclohexylmethyl ether of 4-pyridinealdoxime-1-oxide.

Example 29

Ten thousand (10,000) scored tablets for oral use, each containing 200 mg. of O-n-propyl ether of 4-pyridinealdoxime-1-oxide, are prepared from the following types and amounts of ingredients:

| | G. |
|---|---|
| O-n-propyl ether of 4-pyridinealdoxime-1-oxide | 2000 |
| Starch, U.S.P. | 170 |
| Talc, U.S.P. | 130 |
| Lactose, U.S.P. | 2600 |
| Sucrose powder, U.S.P. | 37 |
| Calcium stearate | 19.5 |

The finely powdered lactose and sucrose are mixed well and the mixture is granulated with 10% starch paste. The wet mass is forced through an 8-mesh screen, dried at 120° F. in a forced-air oven, and then put through a 16-mesh screen. The remainder of the ingredients, in fine powder form are mixed well and then mixed with the dried lactose granules. The final mixture is then compressed into tablets, which are administered at the rate of 1 to 2 tablets 2 to 4 times daily for the alleviation of preoperative and postoperative tensions and anxieties.

Example 30

Ten thousand (10,000) two-piece hard gelatin capsules for oral use each containing 100 mg. of O-allyl ether of 4-pyridinealdoxime-1-oxide hydrochloride are prepared from the following ingredients:

| | G. |
|---|---|
| O-allyl ether of 4-pyridinealdoxime-1-oxide hydrochloride | 1000 |
| Lactose, U.S.P. | 750 |
| Starch, U.S.P. | 300 |
| Talc, U.S.P. | 65 |
| Calcium stearate | 25 |

One to three capsules are administered every 4 hours for controlling epilepsy and psychomotor seizures.

Example 31

One-piece soft elastic capsules for oral use, each containing 50 mg. of O-benzyl ether of 4-pyridinealdoxime-1-oxide, are prepared in the usual manner by first dispersing the powdered active material in sufficient corn oil to render the material capsulatable.

One to four capsules are administered 2 to 4 times daily to relieve pain and stiffness in muscles and joints.

Example 32

An aqueous preparation for oral use containing 350 mg. of O-n-propyl ether of 4-pyridinealdoxime-1-oxide in each 5 ml. is prepared from the following ingredients:

| | |
|---|---|
| O-n-propyl ether of 4-pyridinealdoxime-1-oxide g-- | 700 |
| Methylparaben, U.S.P. g-- | 7.5 |
| Propylparaben, U.S.P. g-- | 2.5 |
| Saccharin sodium g-- | 12.5 |
| Cyclamate sodium g-- | 2.5 |
| Glycerin ml-- | 3000 |
| Tragacanth powder g-- | 10 |
| Orange oil flavor g-- | 10 |
| F. D. and C. Orange Dye g-- | 7.5 |
| Deionized water, q.s. to 10,000 ml. | |

One to two teaspoonfuls are administered 3 times daily to control emotional disturbances such as anxiety, tension, tension headache, agitated depression, and acute agitation.

Example 33

A sterile aqueous solution suitable for intramuscular or intravenous use and containing 400 mg. of O-n-propyl ether of 4-pyridinealdoxime-1-oxide in each ml. is prepared from the following ingredients:

| | G. |
|---|---|
| O-n-propyl ether of 4-pyridinealdoxime-1-oxide | 400 |
| Chlorobutanol | 3 |
| Water for injection q.s. to 1000 ml. | |

One to two ml. are injected intramuscularly for the relief of pain and the acute phase of skeletal muscle spasm. Up to 5 ml. is given intravenously in more severe conditions requiring prompt relief.

Example 34

Ten thousand (10,000) two-piece hard gelatin capsules for oral use, each containing 100 mg. of O-n-propyl ether of 4-pyridinealdoxime-1-oxide and 65 mg. of ethoxazolamide are prepared from the following ingredients:

| | G. |
|---|---|
| O-n-propyl ether of 4-pyridinealdoxime-1-oxide | 1000 |
| Ethoxazolamide | 650 |
| Corn starch, U.S.P. | 500 |
| Magnesium stearate | 25 |
| Talc, U.S.P. | 65 |

One to two capsules are administered 3 times daily for the relief of premenstrual tension.

Example 35

Ten thousand (10,000) tablets for oral use, each containing 150 mg. of O-n-propyl ether of 4-pyridinealdoxime-1-oxide, 1 mg. of methylprednisolone, and 300 mg. of aspirin, are prepared from the following ingredients:

| | G. |
|---|---|
| O-n-propyl ether of 4-pyridinealdoxime-1-oxide | 1500 |
| Methylprednisolone | 10 |
| Aspirin | 3000 |
| Starch | 750 |
| Magnesium stearate | 25 |
| Talc | 50 |

The ingredients are mixed carefully and slugged. The slugs are broken into granules which are compressed into tablets of the correct weight.

The tablets so prepared are useful in the treatment of moderate cases of rheumatoid arthritis by the administration of 1 to 2 tablets 3 to 4 times daily.

We claim:
1. A compound selected from the class consisting of (1) compounds of the formula

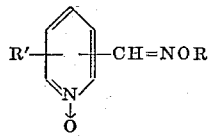

wherein R' is selected from the class consisting of hydrogen and methyl; and R is hydrocarbon selected from the class consisting of alkyl of from one to twelve carbon atoms, inclusive, alkenyl of from three to twelve carbon atoms, inclusive, aralkyl of from seven to twelve carbon atoms, inclusive, aralkenyl of from eight to twelve carbon atoms, inclusive, cyclopentyl, cyclohexyl, cyclopentenyl, cyclohexenyl, cyclopentylalkyl and cyclopentenylalkyl of from six to twelve carbon atoms, inclusive, and cyclohexylalkyl and cyclohexenylalkyl of from seven to twelve carbon atoms, inclusive; and (2) pharmacologically acceptable acid addition salts thereof.

2. O-n-propyl ether of 4-pyridinealdoxime-1-oxide.
3. O-alkenyl ether of 4-pyridinealdoxime-1-oxide wherein alkenyl is of from 3 to 12 carbon atoms, inclusive.
4. O-cycloalkyl ether of 4-pyridinealdoxime-1-oxide wherein cycloalkyl is of from 5 to 6 carbon atoms, inclusive.
5. O-allyl ether of 4-pyridinealdoxime-1-oxide.
6. O-benzyl ether of 4-pyridinealdoxime-1-oxide.
7. O-(3-phenylpropyl) ether of 4-pyridinealdoxime-1-oxide hydrochloride.
8. O-ethyl ether of 4-pyridinealdoxime-1-oxide.
9. O-n-propyl ether of 3-methyl-4-pyridinealdoxime-1-oxide.
10. O-isopropyl ether of 4-pyridinealdoxime-1-oxide.
11. O-n-butyl ether of 4-pyridinealdoxime-1-oxide.
12. O-sec.butyl ether of 4-pyridinealdoxime-1-oxide.
13. O-isobutyl ether of 4-pyridinealdoxime-1-oxide.
14. O-crotyl ether of 4-pyridinealdoxime-1-oxide hydrochloride.
15. O-(1-methylallyl) ether of 4-pyridinealdoxime-1-oxide hydrochloride.
16. O-n-amyl ether of 4-pyridinealdoxime-1-oxide.
17. O-n-hexyl ether of 4-pyridinealdoxime-1-oxide.
18. O-n-dodecyl ether of 4-pyridinealdoxime-1-oxide.
19. O-aralkyl ether of 4-pyridinealdoxime - 1 - oxide wherein aralkyl is of from 7 to 12 carbon atoms, inclusive.
20. O-cyclohexyl ether of 4-pyridinealdoxime-1-oxide.
21. O-(2-phenethyl) ether of 4-pyridinealdoxime-1-oxide.
22. O-methyl ether of 4-pyridinealdoxime-1-oxide.
23. O-aralkenyl ether of 4-pyridinealdoxime-1-oxide wherein aralkenyl is of from 8 to 12 carbon atoms, inclusive.
24. O-cinnamyl ether of 4-pyridinealdoxime-1-oxide.
25. O-alkyl ether of 4-pyridinealdoxime-1-oxide wherein alkyl is of from one to twelve carbon atoms, inclusive.

References Cited by the Examiner
UNITED STATES PATENTS

| | | | |
|---|---|---|---|
| 2,500,131 | 3/50 | Linsker | 260—279 |
| 2,518,130 | 8/50 | Evans et al. | 260—250 |
| 2,785,170 | 3/57 | Kagan | 260—296 |
| 2,785,171 | 3/57 | Birkenmeyer | 260—296 |
| 2,924,604 | 2/60 | Steinhards et al. | 260—296 |

OTHER REFERENCES

Chemical Abstracts, volume 51, page 14721 (1957), abstracting Eckstein et al., Dissertations Pharm., volume 8, pages 239–47 (1956).

Chemical Abstracts, volume 52, pages 6337–8 (1958), abstracting Eckstein et al., Dissertations Pharm., volume 9, pages 197–204 (1957).

Culvenor: "Rev. of Pure and Applied Chem.," volume 3, No. 2, pages 83–109 (1953).

WALTER A. MODANCE, *Primary Examiner.*

D. T. McCUTCHEN, IRVING MARCUS, *Examiners.*